No. 629,313. Patented July 18, 1899.
J. CARPENTER.
COMBINED HARROW, PULVERIZER, AND CRUSHER.
(Application filed Aug. 4, 1898. Renewed May 26, 1899.)

(No Model.) 2 Sheets—Sheet 1.

WITNESSES
Saml R. Turner
Chas. S. Hyer.

INVENTOR
Jacob Carpenter.
By R. S. & A. B. Lacey,
Attorneys.

No. 629,313. Patented July 18, 1899.
J. CARPENTER.
COMBINED HARROW, PULVERIZER, AND CRUSHER.
(Application filed Aug. 4, 1898. Renewed May 26, 1899.)
(No Model.) 2 Sheets—Sheet 2.
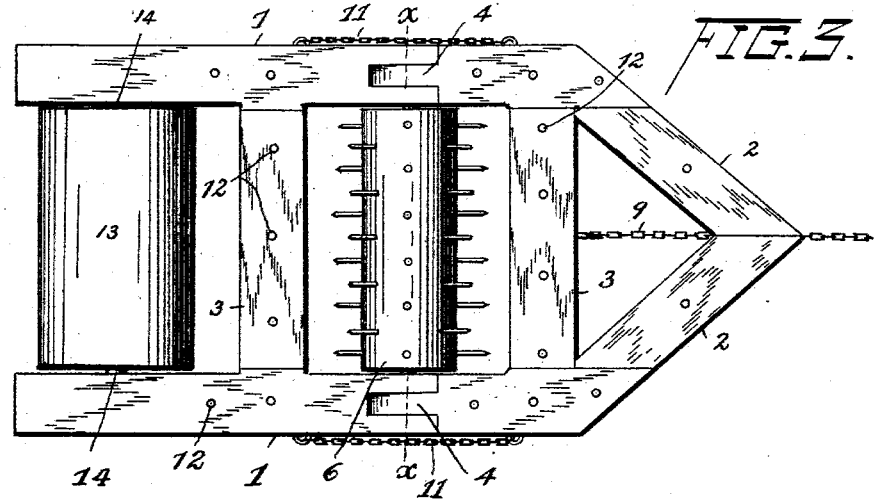
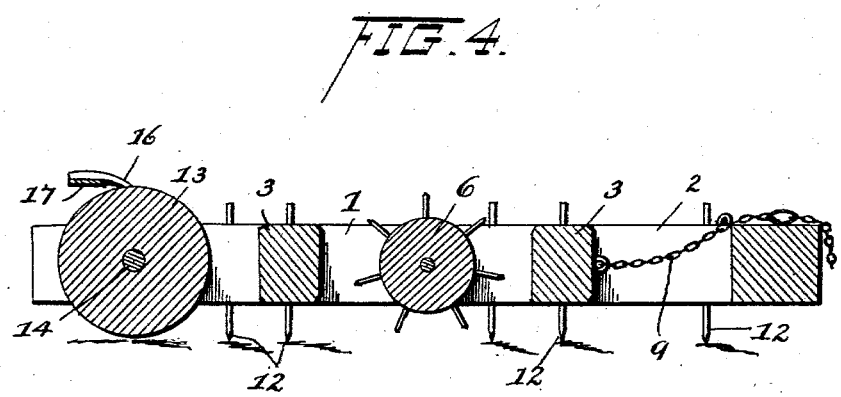
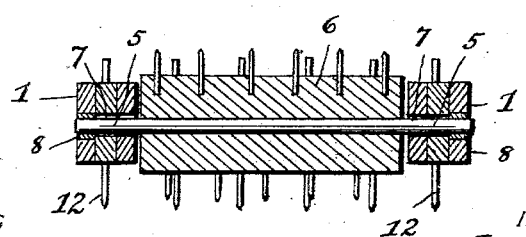
WITNESSES
Sam'l R. Turner
Chas. S. Hyer
INVENTOR
Jacob Carpenter.
By R. S. & D. Lacey
Attorneys
THE NORRIS PETERS CO., PHOTO-LITHO., WASHINGTON, D. C.

UNITED STATES PATENT OFFICE.

JACOB CARPENTER, OF ENTERPRISE, OHIO.

COMBINED HARROW, PULVERIZER, AND CRUSHER.

SPECIFICATION forming part of Letters Patent No. 629,313, dated July 18, 1899.

Application filed August 4, 1898. Renewed May 26, 1899. Serial No. 718,424. (No model.)

*To all whom it may concern:*

Be it known that I, JACOB CARPENTER, a citizen of the United States, residing at Enterprise, in the county of Hocking and State of Ohio, have invented certain new and useful Improvements in a Combined Harrow, Pulverizer, and Crusher; and I do hereby declare the following to be a full, clear, and exact description of the invention, such as will enable others skilled in the art to which it appertains to make and use the same.

This invention relates to a combined harrow, pulverizer, and crusher; and it consists, essentially, of a frame having joints intermediate of its length to permit a conformation to irregularities of ground surface and flexible connections extending across the joints to remove the draft strain from the pivots as much as possible, a toothed pulverizing-roller being confined in the frame, with depending harrow-teeth located in advance, on opposite sides, and in rear of the same, a crushing-roller being also rotatably mounted near the rear end of the frame and having an automatically-adjustable scraper extending thereover.

The invention further consists of the details of construction and arrangement of the several parts, which will be more fully hereinafter described and claimed.

The object of the invention is to combine in one machine a number of devices for successfully and successively carrying on a harrowing, pulverizing, and crushing operation by a single movement of the machine during a run thereof over a certain tract of ground surface and avoid the use of separate machines and a repeated traverse of the ground to accomplish the same result.

Figure 1:
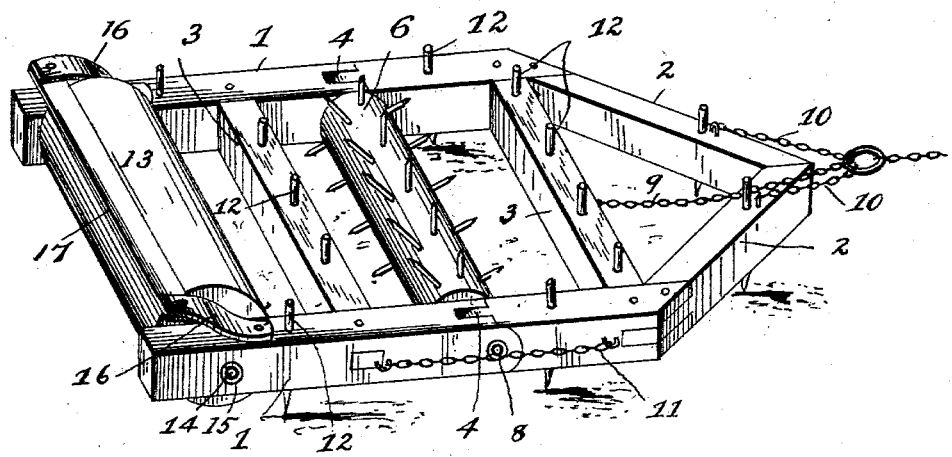
Figure 2:
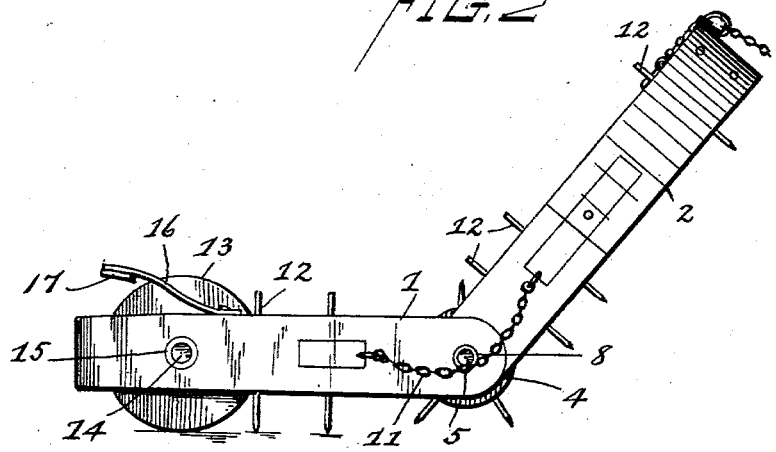

In the accompanying drawings, Figure 1 is a perspective view of a combined machine embodying the invention. Fig. 2 is a side elevation thereof, showing a part raised. Fig. 3 is a bottom plan view. Fig. 4 is a central longitudinal vertical section. Fig. 5 is a transverse vertical section on the line $x\,x$, Fig. 3.

Referring to the drawings, wherein similar numerals are employed to indicate corresponding parts in the several views, the numeral 1 designates a frame composed of opposite longitudinally-disposed parallel side bars united at the front by converging bars 2 and also provided with intermediate cross-bars 3. The side bars are formed of wood and primarily separated near their front ends and pivotally jointed, as at 4, the adjacent united ends being formed with tenons and slots, respectively, and therein are loosely fitted the opposite trunnions 5 of a toothed pulverizing-roller 6, rotatably confined between the said side bars. The openings 7, formed through the united parts of said side bars, are slightly larger than the said trunnions, and in the outer portions thereof metallic sleeves 8 are fitted and form bearings for the trunnions, and thereby wear on the adjacent parts of the openings is prevented.

To the center of the front bar a draft-chain or analogous device 9 is secured and extends over the forwardly-projecting converging bars 2, laterally-extending chains or other like devices 10 being connected to said bars and chain 9. Across the pivot-joints of the side bars chains 11 extend from one part of each to the other to transfer the longitudinal draft strain and prevent direct concentration thereof on the pivots. These chains 11 are sufficiently taut to produce the desired effect stated and also to reinforce the joints against lateral strain that might occur from an irregular movement or drag of the entire machine or from a lateral slipping movement.

Depending from the cross-bars 3 and also from the side bars 1 are rigid harrow-teeth 12 of suitable formation and having any preferred means of fastening, and in rear of the back cross-bar a crushing-roller 13 is mounted and has opposite end trunnions 14, freely movable in wear-sleeves 15, fitted in openings in adjacent parts of the side bars.

On the side bars near the crushing-roller the lower ends of spring-arms 16 are secured and slightly curve rearwardly and upwardly and have the ends of a transverse scraper-bar 17 attached thereto and provided with a front reduced edge, and in operation the said bar is pressed downwardly until the reduced edge thereof bears on the said crushing-roller and removes all earth that may adhere to the latter. After sufficient use of the bar pressure is released therefrom and the resiliency of the arms 16 restores it to normal position.

The frame, cross-bars, and rollers are preferably formed of wood, though metal can be used, if desired, and when the machine is resting on a level the points of the harrow-teeth, the teeth of the pulverizing-roller, and the crushing-roller all touch the surface about equally under normal conditions. In its movement over ground to be treated the front harrow-teeth first strike and partially break up the lumps or clods, the teeth of the pulverizing-roller are then pressed into and dragged through the same, the harrow-teeth behind the said roller next further comminute the broken lumps, and the crushing-roller at the rear completes the breaking up of the remaining unbroken lumps. The joints of the side bars cause both the front and rear part of the frame and the parts carried thereby to conform to the irregularities of the surface traversed and effectually perform the desired operation. Also, as shown by Fig. 2, the front part of the machine can be thrown up to reduce its longitudinal extent for convenience in storage.

Many advantages will become apparent by the use of the machine set forth, and changes in the proportions, dimensions, and minor details of construction can be resorted to without departing from the nature or spirit of the invention.

Having thus described the invention, what is claimed as new is—

1. In a combined device of the character set forth, the combination of a jointed frame having depending harrow-teeth, a toothed pulverizing-roller and a rear crushing-roller, the points of the harrow-teeth and teeth of the pulverizing-roller and the crushing-roller all normally resting equally on the surface of the ground.

2. In a combined device of the character set forth, the combination of a frame having opposite side joints and depending harrow-teeth, a toothed pulverizing-roller having trunnions forming pivots for said joints, flexible connections extending across the joints on the outer sides of the same, a rear crushing-roller, and a draft-chain or analogous device attached to the front end of the said frame.

3. In a combined device of the character set forth, the combination with a frame having joints formed in opposite sides thereof and provided with depending harrow-teeth, a pulverizing-roller and a crushing-roller, of a draft-chain attached to the front part of said frame, and chains extending across the outer sides of the joints of the frame.

4. In a combined device of the character set forth, the combination with a frame having depending harrow-teeth, a pulverizing-roller and a crushing-roller, of yielding arms attached to the frame on opposite sides of the crushing-roller and connected to a scraper-bar having a front reduced edge adapted to be pressed down on the crushing-roller to clean the same.

5. In a combined device of the character set forth, the combination of a frame having opposite side joints and depending harrow-teeth, a toothed pulverizing-roller having trunnions forming pivots for said joints, chains extending across the outer sides of said joints and connected at the opposite ends to portions of the frame respectively at the front and rear of said joints, a draft-chain or analogous device attached to the front end of the said frame, a crushing-roller at the rear of the frame, upwardly-extending spring-arms on opposite sides of said crushing-roller, and a scraper-bar attached to the said spring-arms and adapted to be pressed down against the crushing-roller to clean the same.

In testimony whereof I affix my signature in presence of two witnesses.

JACOB CARPENTER.

Witnesses:
L. A. MATHIAS,
H. F. CARPENTER.